United States Patent

Suzuki et al.

[11] 3,891,664
[45] June 24, 1975

[54] NAPHTH[2,1-D]ISOXAZOLYL-3-DIAZOMETHYL KETONES

[75] Inventors: Yasushi Suzuki, Yokohama; Toshihisa Itaya; Nobuyoshi Minami, both of Kawasaki; Masaaki Tarutani; Tokutaro Miki, both of Tokyo; Katsuhiko Miyasaka, Kawasaki, all of Japan

[73] Assignee: Teikoku Hormone MFG Co., Ltd., Tokyo, Japan

[22] Filed: Jan. 13, 1972

[21] Appl. No.: 217,631

Related U.S. Application Data

[62] Division of Ser. No. 864,163, Oct. 6, 1969, abandoned.

[30] Foreign Application Priority Data

| Oct. 8, 1968 | Japan | 43-72990 |
| Oct. 8, 1968 | Japan | 43-72991 |
| Apr. 26, 1969 | Japan | 44-32241 |
| Apr. 26, 1969 | Japan | 44-32242 |
| Apr. 26, 1969 | Japan | 44-32243 |

[52] U.S. Cl. ............ 260/307 D; 260/247.5 EP; 260/268 TR; 260/293.58; 424/272
[51] Int. Cl. .............................. C07d 85/22
[58] Field of Search ............... 260/307 H, 307 D

[56] References Cited
FOREIGN PATENTS OR APPLICATIONS
989,772  4/1965  United Kingdom ........... 260/307
25,656   1967   Japan

*Primary Examiner*—Donald G. Daus
*Assistant Examiner*—Jose Tovar
*Attorney, Agent, or Firm*—Sherman & Shalloway

[57] ABSTRACT

3-substituted naphth[2,1-d]isoxazolyl derivatives of the formula

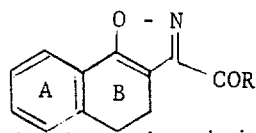

wherein the ring A may be substituted or unsubstituted, the ring B may have a carbon-to-carbon double bond between the positions of C-4 and C-5, and R represents a halogen atom or a group $—CHN_2$. Such ixoazolyl derivatives are prepared by reacting a compound of the formula

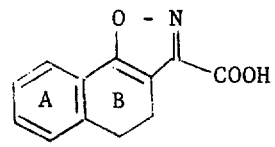

with a halogenating agent, or by reacting a compound of the formula

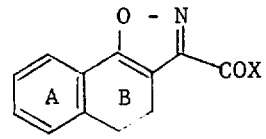

with diazomethane.

The isoxazolyl derivatives wherein ring B has a carbon-to-carbon bond between the positions C-4 and C-5 can be prepared by reacting a compound of the formula

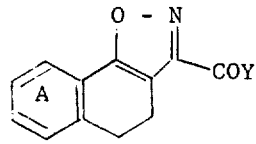

with a dehydrogenating agent, Y representing a halogen atom or a hydroxy group.

3 Claims, No Drawings

NAPTH[2,1-D]ISOXAZOLYL-3-DIAZOMETHYL KETONES

This application is a divisional application of our co-pending application Ser. No. 864,163 filed on Oct. 6, 1969 now abandoned.

This invention relates to novel 3-substituted naphth[2,1-d]isoxazolyl derivertives and processes for preparing the same.

According to this invention novel 3-substituted naphthisoxazolyl derivatives expressed by the following general formula

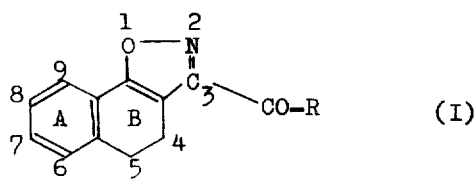

wherein the ring A may be substituted or unsubstituted, the ring B may have a carbon-to-carbon double bond between the positions of C-4 and C-5, and R represents a halogen atom or a group —$CHN_2$ are provided, In the above general formula (I), the ring A may be mono-, di- or tri-substituted with optional substituents; for instance, alkoxy groups such as methoxy, ethoxy, n- or iso-propoxy and n-, iso-, sec- or tert-butyl, preferably alkoxy groups of 4 or less carbon atoms; alkyl groups such as methyl, ethyl and n- or iso-propyl, preferably alkyl groups of 4 or less carbon atoms; and halogen atoms such as bromine, chlorine, and iodine. The ring B may either be saturated between the positions of C-4 and C-5 or have a carbon-to-carbon double bond between the positions of C-4 and C-5.

Novel compounds of this invention expressed by the above general formula (I) are divided into two groups. One of the above two groups includes napth[2,1-d]isoxazolyl-3-carboxylic acid halides and derivatives thereof expressed by the following general formula:

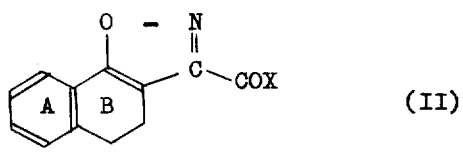

wherein the rings A and B are as defined above in general formula (I) and X represents a halogen atom such as chlorine, bromine and iodine, particularly chlorine.

As the acid halide of the formula (II), following compounds may be cited, for instance, 4,5-dihydronaphth [2,1-d] isoxazolyl-3-carbonyl chloride, 4,5-dihydronaphth[2,1-d] isoxazolyl-3-carbonyl bromide, 7- or 8-methoxy-4,5-dihydronaphth [2,1-d]isoxazolyl-3-carbonyl chloride, 7- or 8- oxy-4,5-dihydronaphth[2,1-d]isoxazolyl-3-carbonyl chloride, naphth [2,1-d]isoxazole-3-carbonyl chloride, 6-bromo-naphth[2,1-d] isoxazolyl-3-carbonyl bromide, and 6-chloro-7-methoxynaphth [2,1-d]isoxazolyl-3-carbonyl chloride.

The other group includes a naphth[2,1-d]isoxazolyl diazomethyl ketone and derivatives thereof expressed by the following general formula:

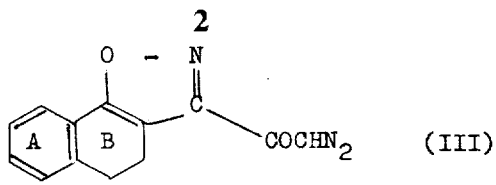

wherein the rings A and B are as defined above in general formula (I).

As the diazo compounds expressed by the general formula (III), the following compounds can be cited, for instance, 4,5-dihydronaphth[2,1-d]isoxazolyl-3-diazoketone, 7-methoxy-4,5-dihydronaphth[2,1-d]isoxazolyl-3-diazoketone, 8-methoxy-4,5-dihydronaphth[2,1-d]isoxazolyl-3-diazoketone, 7,8-dimethoxy-4,5-dihydronaphth[2,1-d]isoxazolyl-3-diazoketone, naphth[2,1-d]isoxazolyl-3-diazoketone, 7-methoxy naphth[2,1-d] isoxazolyl-3-diazoketone and 6-chloro-7-methoxy naphth[2,1-d] isoxazolyl-3-diazoketone.

Novel compounds expressed by above general formula (I) can be synthesized for instance, by the following methods.

Acid halides expressed by general formula (II) may be synthesized by a method comprising reacting a naphth [2,1-d]isoxazolyl-3-carboxylic acid or its derivative expressed by the following formula:

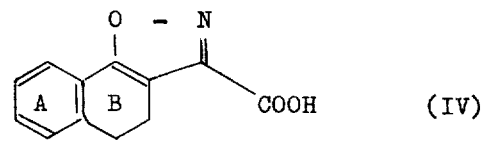

wherein the rings A and B are as defined in general formula (I), with a known reagent capable of halogenating carboxylic acids, under known halogenation conditions.

As the halogenating reagent, phosphorus pentachloride, phosphorus pentabromide, thionyl chloride, thionyl bromide, phosphorus oxychloride, phosphorus oxybromide and the like maya be used. As the compound of the general formula (IV), 4,5-dihydronaphth[2,1-d]isoxazolyl-3-carboxylic acid, 7- or 8-methoxy-4,5-dihydronaphth[2,1-d] isoxazolyl-3-carboxylic acid, 7- or 8-oxydihydronaphth[2,1-d] isoxazolyl-3-carboxylic acid, naphth[2,1-d]isoxazolyl-3-carboxylic acid, 7- or 8-methoxy-naphth[2,1-d]isoxazolyl-3-carboxylic acid and 7- or 8-oxydihydronaphth[2,1-d] isoxazolyl-3-carboxylic acid may be mentioned.

The halogenation of the carboxylic acid of the general formula (IV) may be performed either in the absence of a solvent or in an inert organic solvent, for instance, a halogenated hydrocarbon solvent such as carbon tetrachloride, chloroform and chlorobenzene. The reaction temperature is not particularly critical, but generally speaking, temperatures ranging from 50° to 80°C. are preferred.

Of the acid halides of general formula (II), the compounds in which the ring B has a carbon-to-carbon double bond between the positions of C-4 and C-5 may be prepared by a method comprising subjecting an acid halide of general formula (II) in which the ring B is saturated between the positions of C-4 and C-5 to the cyclo-dehydrogenation treatment which will be detailed hereinbelow, or by a method comprising subjecting a carboxylic acid of general formula (IV) in which the ring B is saturated between the positions of C-4 and C-5 to the cyclo-dehydrogenation treatment and the halogenation treatment simultaneously or successively.

The above cyclo-dehydrogenation treatment can be accomplished, for instance, in an organic solvent having no relation with the reaction under such mild conditions as will not cause any change in the isoxazole ring by employing an ordinary dehydrogenating agent. Dehydrogenating agents particularly suitable for attaining the above dehydrogenating treatment include;

1. chloranil and DDQ (dichlorodicyanobenzoquinone);
2. mild oxidants such as anhydrous chromic acid in acetic acid;
3. molecular halogens such as $Cl_2$, $Br_2$ and $I_2$, and
4. phosphorus pentahalides such as $PCl_5$, $PBr_5$ and $PI_5$.

Reaction conditions vary depending upon the class of the dehydrogenating agent, but the dehydrogenation is generally carried out at temperatures ranging from room temperature to 200°C.

In the case of using a dehydrogenating agent such as chloranil and DDQ, it is preferable to carry out the dehydrogenation with the use of an inert organic solvent such as benzene, toluene and xylene at the boiling point of the solvent. In the case of using anhydrous chromic acid in acetic acid as the dehydrogenating agent, it is desired to perform the reaction at a temperature within a range from room temperature to 50°C. When the reaction temperature exceeds the above range, a side reaction occurs at the isoxazole ring. In the case of using a molecular halogen as the dehydrogenating agent, it is perferable to dissolve the molecular halogen into a halogenated hydrocarbon medium such as carbon tetrachloride and chloroform, and to conduct the reaction at the boiling point of the solvent to be used. In this case, the reaction may be conducted with or without the aid of an activating agent such as a catalyst or light. In the case of using a phosphorus pentahalide as the dehydrogenating agent, a phosphorus trihalide, a phosphorus oxyhalide, a halogenated hydrocarbon and other inert organic solvent such as benzene are used as the reaction medium and preferably the reaction may be carried out at the boiling point of the solvent to be used.

In the case of using a molecular halogen or a phosphorus pentahalide, the use of such dehydrogenating agents in an excessive amount sometimes results in the introduction of a halogen substituent into the ring A of the naphthoisoxazole, but the introduction of such halogen substituent does not bring about any disadvantage on the subject of this embodiment of introducing a carbon-to-carbon double bond between the positions of C-4 and C-5 of the ring B of the 4,5-dihydronaphthisoxazole.

Compounds of general formula (IV) to be used as starting compounds for the synthesis of compounds of general formula (II) may be prepared by a method known per se. For instance, they may be prepared from known alkyl esters of 1-oxo-1,2,3,4-tetrahydro-2-naphthylglyoxylic acid expressed by general formula (V) through the following reaction route:

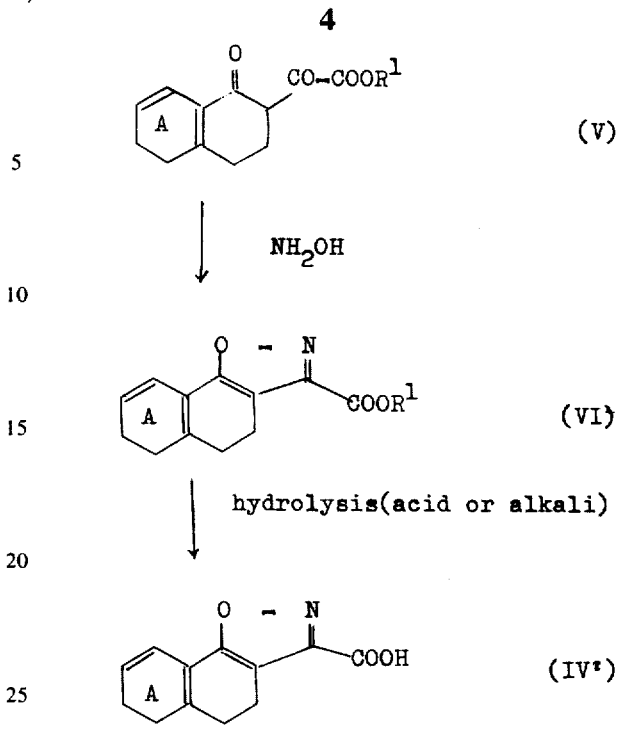

In the above reaction formula, ring A may be substituted or unsubstituted, and $R^1$ stands for an alkyl group.

The carboxylic acid of general formula (IV) in which ring B has a carbon-to-carbon double bond between the positions of C-4 and C-5 may be synthesized by subjecting a compound of general formula (IV') to the abovementioned cyclo-dehydrogenation treatment or by subjecting a compound of general formula (V) or (VI) to the cyclo-dehydrogenation treatment and converting the resulting cyclo-dehydrogenated product to a compound of general formula (IV) which has a carbon-to-carbon double bond between the positions of C-4 and C-5 according to the above reaction route.

The preparation of 4,5-dihydronaphth[2,1-d]isoxazolyl-3-carboxylic acid esters of formula (VI) from 1-oxo-1,2,3,4-tetrahydro-2-naphthylglyoxylic acid alkyl esters of formula (V) and hydroxylamine, and the preparation of free carboxylic acids of formula (IV') from the esters of formula (VI) may be conducted in accordance with the method proposed in Publication No. 25656/67 of Japanese Patent Application or similar methods.

Novel naphth[2,1-d]isoxazolyl diazomethyl ketones and their derivatives expressed by general formula (III) of this invention may be synthesized by reacting carboxylic acid halides of general formula (II) with diazomethane. This reaction has been known as the Arndt-Eistert reaction.

Diazomethyl ketones of general formula (III) in which ring B has a carbon-to-carbon double bond between the positions of C-4 and C-5 may be synthesized by subjecting carboxylic acid halides of general formula (II) in which the ring B has a carbon-to-carbon double bond between the positions of C-4 and C-5 to the Arndt-Eistert reaction.

The reaction of the acid halide of formula (II) with diazomethane can be conducted in an inert organic solvent by maintaining the reaction system at a temperature ranging from −10°C. to room temperature. It is sufficient that the reaction is conducted under atmospheric pressure. The class of the inert organic solvent used is not particularly critical, but the use of an ether such as ethyl ether, tetrahydrofuran and dioxane is particularly preferred. In order to improve the yield of the diazo intermediate product of the above mentioned general formula (III) is is desirable to add to the reaction system an acid binder such as a tertiary amine, e.g., triethyl amine or tripropyl amine, and pyridine, equinoline or isoquinoline. However, in the case of placing an excess of diazomethane in the reaction system, an acid binder need not be added. In order to complete the reaction in a short period of time, it is effective to heat a mixture of the above mentioned acid binder and diazomethane at a temperature up to about 50°C. for a short time, for instance, 1 to 10 minutes.

The so synthesized compounds expressed by general formula (I), namely general formula (II) or (III), are important intermediates leading to naphth[2,1-d]isoxazolyl alkanoic acids and their derivatives and salts of the following general formula (VII), which have excellent analgestic, antipyretic and anti-inflammatory activities superior to those of known steroidal anti-inflammatory medicines and which exhibit a toxicity much lower than that of known steroidal medicines:

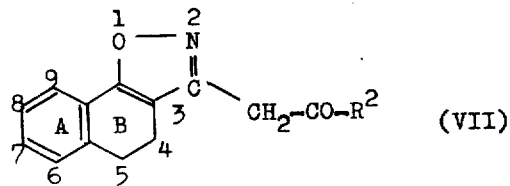

(VII)

wherein the ring A may be substituted or unsubstituted, the ring B may have a carbon-to-carbon double bond between the positions of C-4 and C-5, and $R^2$ stands for a hydroxyl group, a group —OM (in which is M is sodium, potassium, aluminum, magnesium, calcium or ammonium), an alkoxy group, and optionally substituted amino group, an optionally substituted aminoalkoxy group, an optionally substituted aminoalkyl amino group, a morpholino group, a piperidino group, an N-alkyl piperazine group, or a pyrrolidino group.

Alkanoic acids and their derivatives of above general formula (VII) may be synthesized, for instance, by reacting carboxylic acid halides of general formula (II) with diazomethane to form diazomethyl ketones of general formula (III), and then reacting such diazomethyl ketones with an active hydrogen-containing compound selected from the group consisting of water, alcohols, ammonia, and primary and secondary amines. More specifically, they may be synthesized according to the following reaction routes:

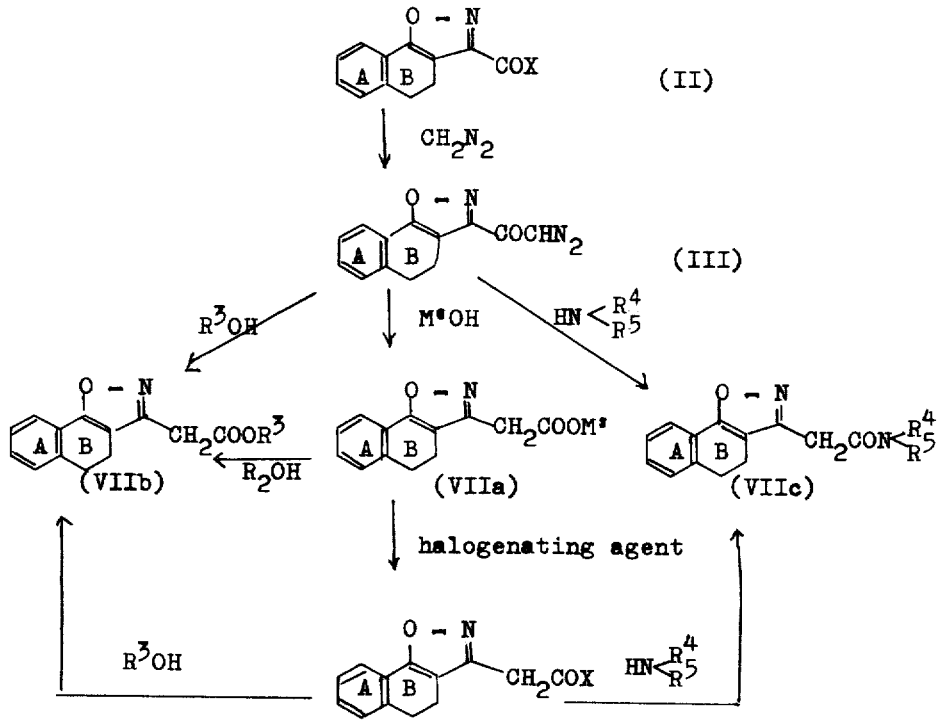

In each of the above formulae, $R^3$ stands for an alkyl group or a group

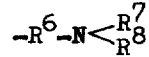

(in which $R^6$ is an alkylene group, and $R^7$ and $R^8$ which may be the same or different stand for a hydrogen atom or an alkyl group, or they may form together with the nitrogen atom a heterocyclic ring which may further contain an oxygen, sulfur or nitrogen atom), $R^4$ and $R^5$, which may be the same or different, stand for a hydrogen atom, an alkyl group, or a group

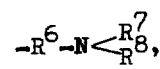

M' has the same meaning as the above-defined M or stands for a hydrogen atom, and X and rings A and B are as defined above.

The preparation of isoxazolyl alkanoic acids of general formula (VII) from diazomethyl ketones of general formula (III) and the utilization of isoxazolyl alkanoic acids of general formula (VII) as medicines are detailed in the specification of our copending application Serial No. 864,163.

For better illustration of the compounds of the above general formula (VII), specific examples thereof will be cited below;

1. Naphth[2,1-d]isoxazolyl-3-alkanoic acids of the formula (VIIa) and their salts such as;
   * 4,5-dihydronaphth[2,1-d]isoxazolyl-3-ethanoic acid,
   * 7-methoxy-4,5-dihydronaphth[2,1-d]isoxazolyl-3-ethanoic acid,
   * 8-methoxy-4,5-dihydronaphth[2,1-d]isoxazolyl-3-ethanoic acid,
   * 7,8-dimethoxy-4,5-dihydronaphth[2,1-d]isoxazolyl-3-ethanoic acid,
   * naphth[2,1-d]isoxazolyl-3-ethanoic acid,
   * 6-chloro-7-methoxy-naphtho[2,1-d]isoxazolyl-3-ethanoic acid, and
   * sodium salts, potassium salts, magnesium salts, calcium salts, aluminum salts, ammonium salts, morpholine salts, pyrine salts and chloline salts of the above mentioned free acids.

2. Naphth[2,1-d]isoxazolyl-3-alkaonic acid esters of the general formula (VIIb) such as;
   * 3-Methoxy-methyl-4,5-dihydronaphth[2,1-d]isoxazole,
   * 3-Ethoxymethyl-4,5-dihydronaphth[2,1-d]isoxazole,
   * 3-tert-Butoxymethyl-4,5-dihydronaphth[2,1-d]isoxazole,
   * 3-Ethoxymethyl-4,5-dihydronaphth[2,1-d]isoxazole,
   * 3-Methoxymethyl-4,5-dihydronaphth[2,1-d]isoxazole,
   * 3-Methoxymethyl-naphth[2,1-d]isoxazole,
   * 3-Methoxymethyl-6-chloro-7-methoxynaphth[2,1-d] isoxazole,
   * 3-N,N-Diethylaminopropyloxycarbonyl-4,5-dihydronaphth[2,1-d]isoxazole, and
   * 3-N,N-Diethylaminoethyloxycarbonylnaphth[2,1-d] isoxazole.

3. 3-carbamoylmethyl-naphth[2,1-d]isoxazoles of the general formula (VIIc) such as;
   * 3-Carbamoylmethyl-4,5-dihydronaphth[2,1-d]isoxazole,
   * 3-Ethylcarbamoylmethyl-4,5-dihydronaphth[2,1-d] isoxazole,
   * 3-N,N-Diethylcarbamoylmethyl-4,5-dihydronaphth [2,1-d]isoxazole,
   * 3-N,N-Diepropylcarbamoylmethyl-4,5-dihydronaphth [2,1-d]isoxazole,
   * 3-N-Butylcarbamoylmethyl-8-methoxy-4,5-dihydronaphth[2,1-d]isoxazole,
   * 3-N-Morpholino carbamoylmethyl-4,5-dihydronaphth [2,1-d]isoxazole,
   * 3-N-Pyrrolidino carbamoylmethyl-4,5-dihydronaphth [2,1-d]isoxazole,
   * 3-N-Piperidino carbamoylmethyl-4,5-dihydronaphth [2,1-d]isoxazole,
   * 3-N-Peperidinocarbamoylmethyl-8-methoxy-4,5-dihydronaphth[2,1-d]isoxazole,
   * 3-Carbamoylmethyl-naphth[2,1-d]isoxazole,
   * 3-Carbamoylmethyl-6-chloro-7-methoxy-naphth [2,1-d]isoxazole,
   * 3-N,N-Dimethylamino propylcarbamoylmethyl-7-methoxy-4,5-dihydronaphth[2,1-d]isoxazole,
   * 3-N,N-Dimethylaminopropylcarbamoylmethyl-8-Methoxy-4,5-dihydronaphth[2,1-d]isoxazole, and
   * 3-N,N-Dimethylaminoethylcarbamoylmethyl-4,5-dihydronaphth[2,1-d]isoxazole.

This invention will now be illustrated by examples.

EXAMPLE 1

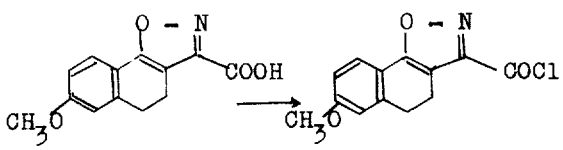

5.5 G of 7-methoxy-4,5-dihydronaphth[2,1-d]isoxazolyl-3-carboxylic acid were added to anhydrous carbon tetrachloride, and then 10 g of thionyl chloride were added thereto. Then, the solution was heated on a water bath until the generation of hydrogen chloride gas was stopped, and then it was concentrated under reduced pressure. Thus, 4.5g of 7-methoxy-4,5-dihydronaphth[2,1-d]isoxazolyl-3-carboxychloride having a melting point of 135°–136.5°C. were obtained. The infrared absorption spectrum of the compound showed absorptions at ν KBr cm$^{-1}$: 1776, 1638, 1605, 1467, 1415, 1250, 1028, and 822.

The starting compound could be synthesized by the following method:

1st Step

2 G of a methyl ester of 6-methoxy-1-oxo-1,2,3,4tetrahydro-2-naphthylglylglyoxylic acid and 3 g of hydroxylamine hydrochloride were added to 40 cc of methanol, and the mixture was heated on a water bath for 10 minutes. Then, 2 g of sodium acetate were added to the mixture, and it was heated on a water bath for 5 minutes.

After completion of the reaction, methanol was removed by distillation, and water was added to the residue. The precipitated crystals were recovered by filtration and recrystallized from methanol to yield 1.6 g of a methyl ester of 7-methoxy-4,5-dihydro-naphth[2,1-d]isoxazolyl-3-carboxylic acid as colorless needles melting at 126°–128°C. and exhibiting a ultra-violet absorption stectrum showing an absorption at $\lambda_{max}^{EtOH}$ 317 mμ (log ε ; 4.19). The elementary analysis values are as follows:

Calculated C = 64.86 %, H = 5.05 %, N = 5.40 %
Found C = 65.09 %, H = 4.99 %, N = 5.52 %

2nd Step 1.4 G of 7-methoxy-4,5-dihydro-naphth[2,1-d] isoxazolyl-3-carboxylic acid methyl ester was dissolved in 30 cc of methanol, and to the solution was added 10 cc of a 10 % aqueous solution of sodium hydroxide were added. The mixture was heated on a water bath for 5 minutes.

The resulting reaction mixture was cooled, and 100 cc of water were added thereto, following which ice was added to the mixture and the pH was adjusted to 3 with concentrated hydrochloric acid. The precipitated crude crystals were recovered by filtration and recrystallized from a mixed liquor of acetone and water to yield 0.9 g of 7-methoxy-4,5-dihydro-naphth[2,1-d]isoxazolyl-3-carboxylic acid as colorless needles melting at 190°–193°C. and exhibiting a ultra-violet absorption spectrum showing an absorption at $\lambda_{max}^{EtOH}$ 315 mμ (log ε ; 4.23). The elementary analysis values are as follows:

Calculated C = 63.67 %, H = 4.52 %, N = 5.71 %
Found C = 63.64 %, H = 4.66 %, N = 5.88 %

EXAMPLE 2

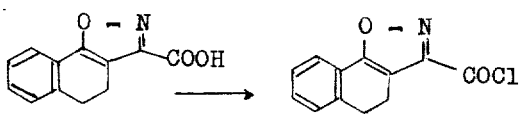

5 G of 4,5-dihydronaphth[2,1-d]isoxazolyl-3-carboxylic acid were added into anhydrous chloroform, and 10 g of phosphorus pentachloride were further added thereto. Then, the solution was heated on a water bath for 3 hours, and was concentrated to dryness under reduced pressure. About 5 g of 4,5-dihydronaphth[2,1-d]isoxazolyl-3-carboxylic chloride were obtained. It melted at 68°–69°C., and exhibited absorptions at $\nu$KBr cm$^{-1}$: 1770, 1640, 1410, 825, 760, and 765 in the infrared absorption spectrum.

EXAMPLE 3

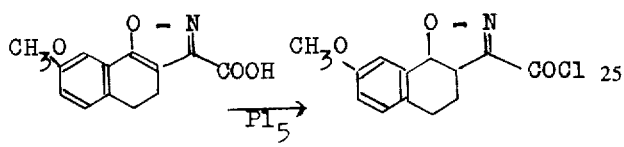

5.5 G of 8-methoxy-4,5-dihydronaphth[2,1-d]isoxazolyl-3-carboxylic acid were added into anhydrous chloroform, and 12 g of phosphorus pentachloride were further added thereto. Then, the mixture was heated on a water bath for 3 hours, and was concentrated under reduced pressure. Thus, 4.5 g of 8-methoxy-4,5-dihydronaphth[2,1-d]isoxazolyl-3-carboxy chloride melting at 99°–100°C. were obtained. The compound exhibited an absorption at $\nu_{CO}{}^{KBr}$ 1765 cm$^{-1}$ in the infrared absorption spectrum.

EXAMPLE 4

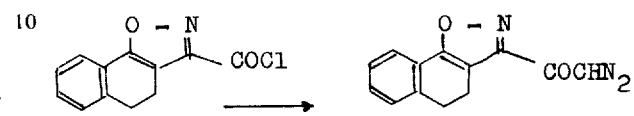

13.2 G of 7-methoxy-4,5-dihydronaphth[2,1-d]isoxazolyl-3-carboxy chloride were dissolved in a mixed solution of 200 ml of ether and 200 ml of tetrahydrofuran. Separately, 200 ml. of an ether solution of diazomethane obtained by decomposition of 62 g of nitrosomethylurea were kept at 0°–5°C., to which the tetrahydrofuran solution of the former compound was added dropwise. After completion of the addition, the temperature was cooled to room temperature and the solution was allowed to stand over night and the formed crystals were collected by filtration. Thus, 6.2 g of 7-methoxy-4,5-dihydronaphth[2,1-d]isoxazolyl-3-diazoketone having a melting point of 167°–168°C. were obtained as yellow platelet crystals. The infrared absorption spectrum of the so obtained compound showed a strong absorption at 2094 cm$^{-1}$ due to the diazomethyl group, —CHN$_2$.

The ultra-violet absorption spectrum showed an absorption at $\lambda_{max}{}^{EtOH}$ 298 m$\mu$ ($\epsilon$: 13,400). The elementary analysis values of the compound are as follows:

Calculated: C = 64.86(%), H = 5.05(%), N = 5.40(%)
Measured: C = 64.56(%), H = 4.61(%), N = 5.33(%)

EXAMPLE 5

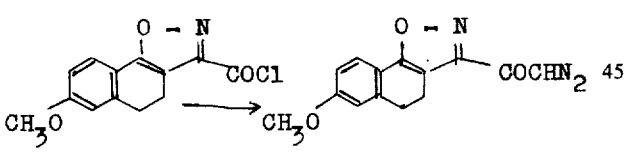

13 G of 4,5-dihydronaphth[2,1-d]isoxazolyl-3-carboxy chloride were dissolved in 200 ml of enter. Separately, diazomethane obtained by decomposition of 35 g of nitrosourea was dissolved in 300 ml of ether which was cooled with cryogen and kept at a temperature between 0° and 5°C. The former solution was added dropwise to the latter solution. Prior to the addition, 6.1 g of triethylamine were added a dehydrochlorinating agent to the diazomethane solution. After completion of the addition, the temperature of the solution was restored to room temperature, and the solution was allowed to stand overnight, washed with water and dried with salt cake. Then, ether was distilled off. Thus, 11.2 g of 4,5-dihydronaphth[2,1-d]isoxazolyl-3-diazoketone having a melting point of 114°–120°C., was obtained as yellow platelet crystals, which exhibited an absorption at 2110 cm$^{-1}$ due to —CHN$_2{}^+$ of the diazomethyl in the infrared absorption spectrum and absorptions at $\lambda_{max}{}^{EtOH}$ 299 m$\mu$ ($\epsilon$: 15,400) and 303 m$\mu$ ($\epsilon$:20,045) in the ultraviolet absorption spectrum.

EXAMPLE 6

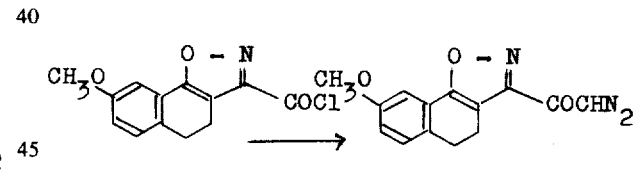

10 G of 8-methoxy-4,5-dihydronaphth[2,1-d]isoxazolyl-3-carboxy chloride were dissolved into a mixed solvent of 100 ml of dried ether and 100 ml of dried tetrahydrofuran. The resulting solution was added dropwise with cooling and stirring to 800 ml of an ether solution of diazomethane obtained from 40 g of N-nitrosomethylurea in a customary manner. After completion of the addition, the stirring was further continued for 2 hours, and the reaction mixture was allowed to remain in a refrigerator overnight. On the following day, the solvent was removed by distillation and the remaining crystals were recrystallized from benzene. Thus, 9.5 g of 8-methoxy-4,5-dihydronaphth [2,1-d]isoxazolyl-3-diazoketone having a melting point of 136°–137°C. were obtained as colorless, needless crystals, which exhibited an absorption at $\nu$KBr 2110 cm$^{-1}$ due to the diazomethyl group in the infrared absorption spectrum.

EXAMPLE 7

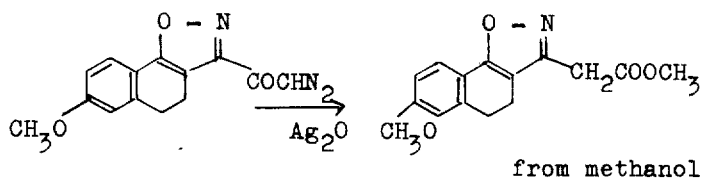

from methanol 4.05 G of 7-methoxy-4,5-dihydronaphth[2,1-d] isoxazolyl-3-diazomethylketone were added into 200 ml of dried methanol, to which 600 mg of silver oxide were gradually added with heating. After completion of the addition of silver oxide, the solution was heated for 2 hours. After completion of the reaction, carbon powder was added to the reaction mixture, the solution was filtered, and the filtrate was concentrated. Then, the so formed crystals were recrystallized from methanol, whereby 5.2 g of 3-methoxy-carbonylmethyl-7-methoxy-4,5-dihydronaphth[2,1-d]isoxazole having a melting point of 85°–87°C. were obtained as white platelet crystals. The infrared absorption spectrum of the so obtained compound showed an absorption at 1745 $cm^{-1}$(C=O), and the absorption of the ultra-violet absorption spectrum were observed at $\lambda_{max}^{EtOH}$ 223 mμ (ε: 22,600) and 292 mμ (ε:36,300). The elementary analysis values of the compound are as follows:

Calculated C = 65.92 (%), H = 5.53(%), N = 5.13(%)
Measured C = 66.12 (%), H = 5.26(%), N = 4.84(%)

EXAMPLE 8

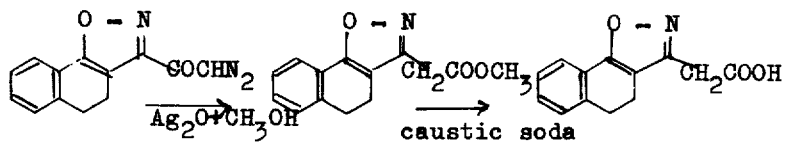

16.2 G of 4,5-dihydronaphth[2,1-d]isoxazolyl-3-diazoketone were added into 300 ml of dried methanol, and 2.4 g of silver oxide were gradually added thereto, with heating. After completion of the addition of silver oxide, the solution was heated for 2 hours. After completion of the reaction, carbon powder was added to the reaction mixture, the solution was filtered and the filtrate was concentrated. Thus, 14.0 g of 3-methoxycarbonylmethyl-4,5-dihydronaphth [2,1-d]isoxazole were obtained as an oily substance. The infrared absorption spectrum of the product showed a strong absorption at 1743 $cm^{-1}$ due to C=O. The so obtained oily substance was heated at 60°C. for 2 hours in a mixed solution of 6 g of caustic soda, 30 ml of water and 50 ml of methanol, when the reaction was completed. Then the solution was cooled to room temperature. As a result a solution of sodium salt of 4,5-dihydronaphth[2,1-d]isoxazolyl-3-ethanoic acid was obtained. A half volume of the solution was concentrated under reduced pressure to dryness. The recrystallization of the dried residue gave 6.1 g of the compound as a white powder.

The remaining half of the solution was dissolved in water of a volume about five times as large as that of the above solution, and when the resulting solution was made acidic with hydrochloric acid, crystals was formed. When these crystals were recrystallized from methanol, 5.5 g of 4,5-dihydronaphth[2,1-d]isoxazolyl-3-ethanoic acid were obtained. The melting point of the crystals was 178°–179°C. The infrared absorption spectrum of the so obtained acid showed a strong absorption at 1725 $cm^{-1}$ due to C=O of the carboxylic acid, and the ultra-violet absorption stectrum showed absorptions at $\lambda_{max}^{EtOH}$ 223 mμ (ε; 15080) and 283 mμ (ε; 17018). The elementary analysis values of the compound as $C_{13}H_{11}O_3N$ is as follows:

Calculated: C = 68.12(%), H = 4.84(%), N = 6.11(%)
Measured : C = 67.84(%), H = 4.90(%), N = 6.17(%)

EXAMPLE 9

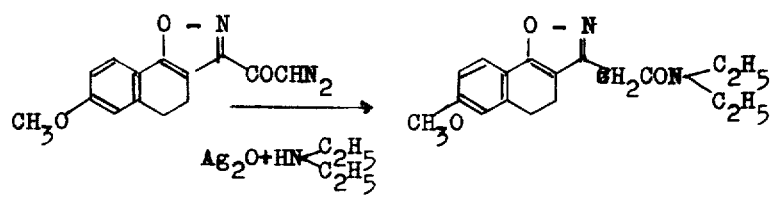

8 G of 7-methoxy-4,5-dihydronaphth[2,1-d]isoxazolyl-3-diaketone were added into 100 ml of diethylamine, and 1.2 g of silver oxide was further added thereto. Then, the mixture was refluxed for 1 hour. After completion of the reaction, silver oxide was removed by filtration. When the filtrate was subjected to distillation, an oily substance was obtained. Then, it was purified by liquid chromatography and recrystallized from acetone. Thus, 2.4 g of 3-N,N-Diethylcarbamoylmethyl-7-methoxy-4,5-dihydronaphth[2,1-d]isoxazole having a melting point of 101°–103°C. were obtained as white platelet crystals, which exhibited an absorption at 1630 $cm^{-1}$ due to C=O of the amide in the infrared absorption spectrum and an absorption at $\lambda_{max}^{EtOH}$ 291 mμ (ε: 17,400) in the ultraviolet absorption spectrum.

EXAMPLE 10

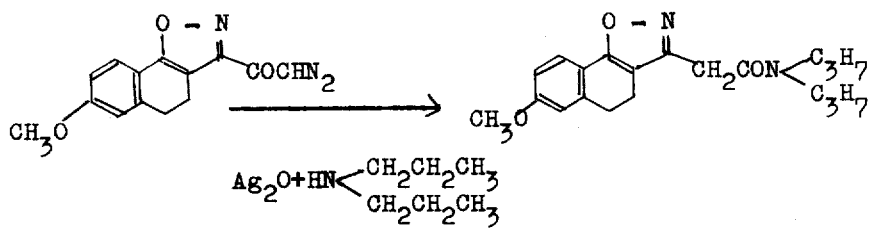

8 G of 7-methoxy-4,5-dihydronaphth[2,1-d]isoxazolyl-3-diazoketone were put into 100 ml. of dipropylamine, and 1.2 g of silver oxide was further added thereto. Then, the mixture was refluxed for 1 hour. At the end of the reaction, the silver oxide was removed by filtration. When the filtrate was removed by distillation, an oily substance was obtained. This substance was purified by liquid chromatography, and recrystallized from acetone. Thus 2.5 g of 3-N,N-dipropylcarbamoylmethyl-7-methoxy-4,5-dihydronaphth[2,1-d] isoxazole having a melting point of 62°–64°C. were obtained as white platelet crystals. Infrared absorption spectrum of the product showed an absorption at 1641 cm$^{-1}$ due to C=O of the amide.

EXAMPLE 11

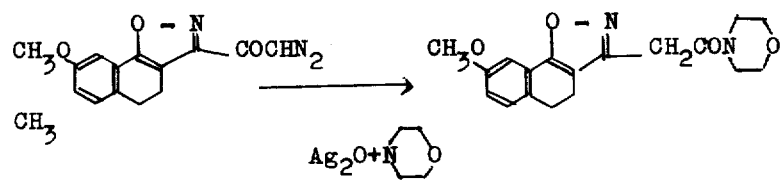

10 G of 8-methoxy-4,5-dihydronaphth[2,1-d]isoxazolyl-3-diazoketone were added into 120 ml of morpholine and 2.0 g of silver oxide was further added thereto. Then, the mixture was refluxed for 1.5 hours. After completion of the reaction, silver oxide was recovered by filtration, and when the filtrate was subjected to distillation, an oily substance was obtained. Then, it was purified by chromatography and recrystallized from acetone. Thus, 3.4 g of 3-N-morpholinocarbamoylmethyl-8-methoxy-4,5-dihydronaphth[2,1-d]isoxazole were obtained. It exhibited an absorption at 1641 cm$^{-1}$ due to C=O of the amide in the infrared absorption spectrum.

EXAMPLE 12

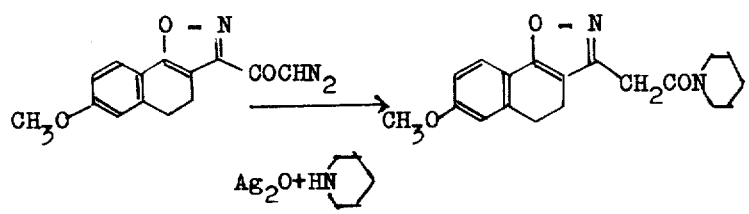

7 G of 7-methoxy-4,5-dihydronaphth[2,1-d]isoxazolyl-3-diazoketone were added into 100 ml of piperidine, and 1.3 g of silver oxide was further added thereto. Then, the mixture was treated by the same method as described in Example 12. Thus 2.1 g of 3-N-piperidinocarbamoylmethyl-7-methoxy-4,5-dihydronaphth[2,1-d]isoxazole were obtained. It exhibited an absorption at 1640 cm$^{-1}$ in the infrared absorption spectrum.

EXAMPLE 13

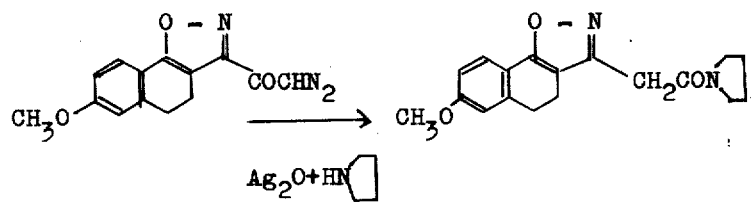

8 G of 7-methoxy-4,5-dihydronaphth[2,1-d]isoxazolyl-3-diazoketone were added to 110 ml of pyrrolidine, and 1.5 g of silver oxide was further added thereto. Then, the mixture was treated by the same method as described in Example 12. Thus, 2.5 g of 3-N-pyrolidinocarbamoylmethyl-7-methoxy-4,5-dihydronaphth[2,1-d]isoxazole were obtained. It exhibited an absorption at 1640 cm$^{-1}$ in the infrared absorption spectrum.

EXAMPLE 14

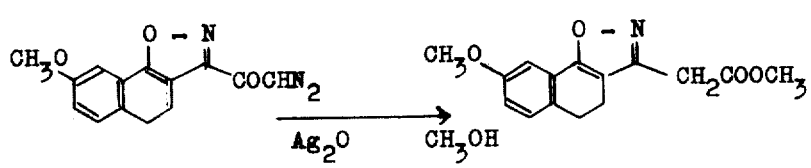

5 G of 8-methoxy-4,5-dihydronaphth[2,1-d]isoxazolyl-3-diazoketone were dissolved in 150 ml of anhydrous methanol, and 1.5 g of silver oxide were further added thereto. Then, the mixture was heated under reflux on a water bath for 5 hours, and after addition of activated carbon, the mixture was subjected to filtration. When the filtrate was concentrated, 4.2 g of 3-methoxycarbonylmethyl-8-methoxy-4,5-dihydronaphth [2,1-d]isoxazole were obtained in the form of a yellow liquid. It exhibited absorptions at 1743 cm$^{-1}$ due to the carbonyl group of the ester and 2960 cm$^{-1}$ due to the methylene group in the infrared absorption spectrum according to the film method.

EXAMPLE 15

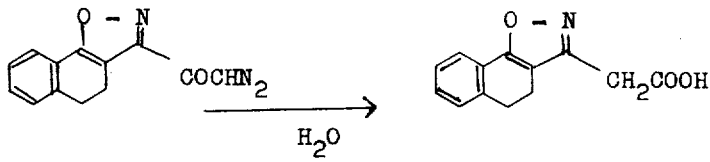

16 G of 4,5-dihydronaphth[2,1-d]isoxazolyl-3-diazoketone was added into 300 ml of a mixed solution of water and benzene, and 3 g of silver oxide was gradually added thereto. Then, the mixture was heated with stirring for 15 hours. After completion of the reaction, silver oxide was removed by filtration and the filtrate was concentrated to precipitate crude crystals of 4,5-dihydronaphth[2,1-d] isoxazolyl-3-ethanoic acid containing the unreacted starting compound. The crude crystals were collected by filtration and dissolved in 10 % aqueous solution of sodium hydroxide, followed by filtration. The filtrate was then made acidic with hydrochloric acid, and the formed crude crystals were collected by filtration and recrystallized from acetone. Thus, 6.3 g of a crystal of 4,5-dihydronaphth[2,1-d]isoxazolyl-3-ethanoic acid melting at 175°-178°C. were obtained.

EXAMPLE 16

4 G of 4,5-dihydronaphth[2,1-d]isoxazolyl-3-diazoketone were added into a mixed solution of 50 ml of benzene and 50 ml of aqueous ammonia, and 1 g of silver oxide was further added thereto. Then, the mixture was heated for 3 hours. After completion of the reaction, silver oxide was removed by filtration and the filtrate was concentrated under reduced pressure. The resulting oily substance was purified by liquid chromatography and recrystallized from acetone. Thus, 1.1 g of 3-carbamoylmethyl-4,5-dihydronaphth[2,1-d]isoxanole having a melting point of 95°-97°C. was obtained and it exhibited an absorption at 1635 cm$^{-1}$ due to the carbonyl group of the amide in the infrared absorption spectrum.

When an aqueous solution of ethylamine or an aqueous solution of propylamine was used instead of aqueous ammonia in the above example, the corresponding 3-N-ethylcarbamoylmethyl-4,5-dihydronaphth[2,1-d]isoxazole, or 3-N-propylcarbamoylmethyl-4,5-dihydronaphth[2,1-d]isonaxole, respectively was obtained. Formation of these compounds was confirmed by absorptions in the vicinity of $\nu_c = {_o}^{KBr}$ 1630 – 1640 cm$^{-1}$ due to the carbonyl group of the amide in the infrared absorption spectrum.

EXAMPLE 17

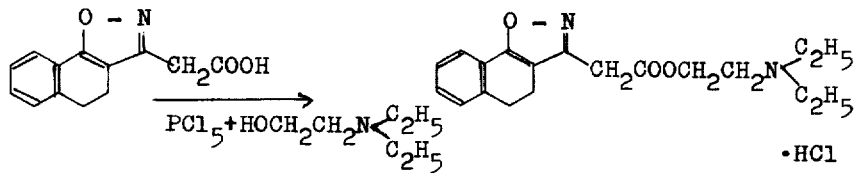

6.87 G of 4,5-dihydronaphth[2,1-d]isoxazolyl-ethanoic acid were dissolved in 200 ml of chloroform. While the solution was being stirred at room temperature, 6.24 g of phosphorus pentachloride were gradually added thereto. Thus, the chlorination was conducted at room temperature. Thereafter, chloroform or phosphoryl chloride was distilled off under reduced pressure, and the residue was dissolved in 200 ml of benzene. To this solution, 7.01 g of N,N-diethylaminoethanol were dissolved in 50 ml of dried benzene, and the resulting solution was added dropwise over a period of about 20 minutes, followed by stirring

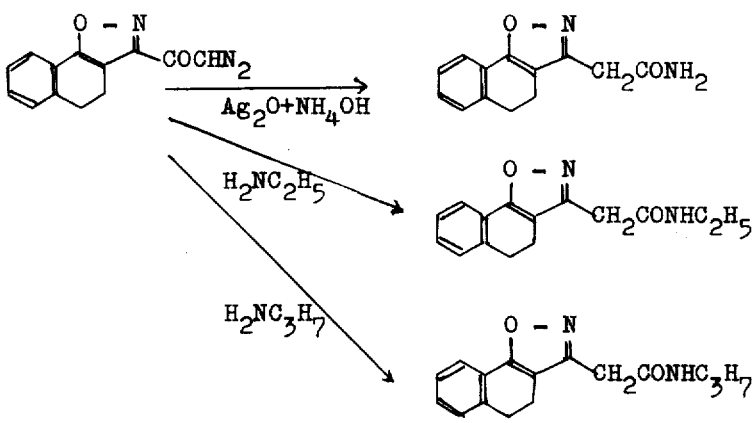

at room temperature for 2 hours. Then, the solution was heated at 50°–60°C. for 30 minutes. After cooling the solution to room temperature, it was washed twice with 50 ml of water and the organic layer was dried with salt cake. Thereafter, benzene was distilled off and the residue was dissolved in dried ether. To the solution was blown hydrochloric acid gas was blown to precipitate white crystals. The formed crystals were collected by filtration and recrystallized from ethyl acetate-methanol. Thus, 5.4 g of N,N-diethylaminoethanol ester hydrochloride of 4,5-dihydronaphth[2,1-d] isoxazolyl-3-ethanoic acid having a melting point of 137°–139°C were obtained as white platelet crystals. The compound exhibited absorptions at IR $\nu$KBr 1745 cm$^{-1}$ (C=O) and 2630 cm$^{-1}$ (N$^+$H) in the infrared absorption spectrum. The elementary analysis values of the so obtained compound are as follows:

Calculated: C = 62.54(%), H = 6.91(%), N = 7.68(%)
Measured: C = 62.41(%), H = 6.73(%), N = 7.59(%)

EXAMPLE 18

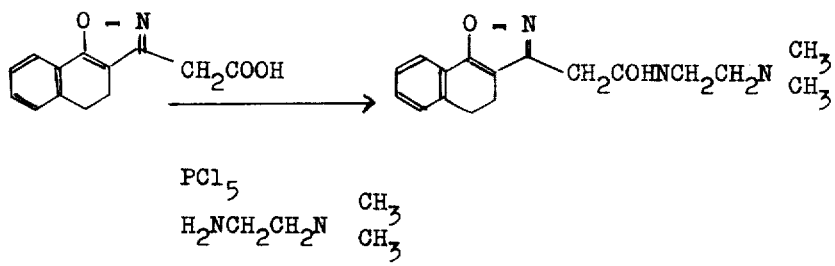

5.7 G of 4,5-dihydronaphth[2,1-d]isoxazolyl-3-ethanoic acid were dissolved in 100 ml of chloroform, and 6.24 g of phosphorus pentachloride were added gradually thereto. Then, the solution was heated at 40°–50°C. for 2 hours. After completion of the reaction, chloroform and phosphoryl chloride were distilled off, and the residue was dissolved in 200 ml of dried benzene, and the solution was stirred at room temperature. 4.4 G of N,N-dimethylaminoethylamine dissolved in 50 ml of benzene were gradually added dropwise to the above solution. Then, the solution was stirred at room temperature for 3 hours, and was heated at 50°–60°C. for 30 minutes. After the reaction mixture had been cooled to room temperature, it was washed twice with 50 ml of water, and the organic layer was dried over salt cake. Then, benzene was distilled off. The residue was dissolved in ether, and hydrochloric acid gas was blown into the ether solution to precipitate white crystals. Then, the crystals were collected by filtration and recrystallized from a mixed solution of ethyl acetate and methanol. Thus, 3.2 g of hydrochloride of 3-N,N-dimethylaminoethylcarbamoylmethyl-4,5-dihydronaphth[2,1-d]isoxazole having a melting point of 245°–248°C. were obtained as white needle-like crystals which exhibited absorptions at $\nu_{max}^{KBr}$; 2660 cm$^{-1}$(N$^+$H) and 1640 cm$^{-1}$(C=O).

What we claim is:
1. A compound of the formula

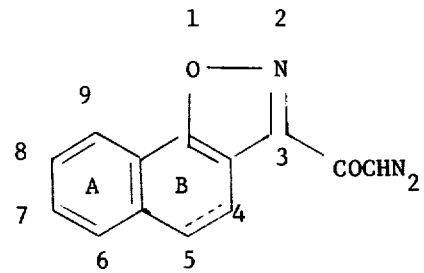

wherein ring A has 0 to 2 substituents selected from alkyl of 1 to 4 carbon atoms, alkoxy of 1 to 4 carbon atoms and halogen, provided that when the substituents are alkyl, they are not adjacent if tertiary butly.

2. A compound of claim 1 wherein said compound is 4,5-dihydronaphth[2,1-d] isoxazolyl-3-diazomethyl Ketone.

3. A compound of claim 1 wherein said compound is naphth[2,1-d]isoxazolyl-3-diazomethyl ketone.

* * * * *